United States Patent [19]

Cooper

[11] 4,164,492

[45] Aug. 14, 1979

[54] NOVEL CATALYST FOR CURING POLYESTER RESINS AND METHOD FOR DETERMINING THE DEGREE OF CURE IN POLYESTER AND EPOXY RESIN SYSTEMS

[75] Inventor: Troy L. Cooper, Canal Fulton, Ohio

[73] Assignee: Alco Standard Corporation, Valley Forge, Pa.

[21] Appl. No.: 886,535

[22] Filed: Mar. 14, 1978

[51] Int. Cl.$^2$ ............................................... C08K 5/23
[52] U.S. Cl. .............................. 260/40 R; 260/37 EP
[58] Field of Search ......................... 260/37 EP, 40 R

[56] References Cited

U.S. PATENT DOCUMENTS

| | | | |
|---|---|---|---|
| 3,030,329 | 4/1962 | Warnsdorfer | 260/37 EP |
| 3,181,991 | 5/1965 | Leneskis | 252/430 |
| 3,390,121 | 6/1968 | Burford et al. | 260/40 R |
| 4,069,191 | 1/1978 | Post | 260/37 EP |

*Primary Examiner*—Sandra M. Person
*Attorney, Agent, or Firm*—Hamilton, Renner & Kenner

[57] ABSTRACT

Disclosed is a novel method for determining the degree of cure of polyester and epoxy resins which includes the steps of adding a catalyst, containing a pigment, to the resin; mixing the two components to provide a visually uniform distribution of the catalyst and pigment throughout the resin; and, depositing the mixture in a desired position for curing. The pigment can also be added directly to the resin rather than the catalyst. Additionally, in either alternative, at the completion of the curing the color imparted by the pigment has substantially disappeared from the cured product as though no pigment had been employed. Also disclosed is a novel benzoyl peroxide paste composition, for curing polyester resins, having a pigment the color of which substantially disappears from the cured product.

8 Claims, No Drawings

NOVEL CATALYST FOR CURING POLYESTER RESINS AND METHOD FOR DETERMINING THE DEGREE OF CURE IN POLYESTER AND EPOXY RESIN SYSTEMS

BACKGROUND OF THE INVENTION

The present invention relates to benzoyl peroxide catalysts for use in curing polyester resins and various methods which enable the worker to ascertain visually the proper hardness or degree of cure of polyester or epoxy resin systems and to produce cured products therefrom which are substantially free from color.

It has been established procedure within the plastics industry to employ a pigment in the catalyst, which is admixed with a resin system to initiate curing of the latter, as a method of providing a visual indicator that a uniform distribution of the catalyst throughout the resin has been made. Improper amounts of catalyst or a non-homogeneous mixture of resin and catalyst will result in areas which do not cure or harden sufficiently to be acceptable.

Equally important in several of the industries is the time necessary for curing to take place. Polyester resins can be applied at room temperature to a substrate or can be molded in ovens and are generally totally cured within 15–20 minutes after initiation by the catalyst, while epoxy resins are slower, requiring up to about 24 hours to harden completely. In the repair industry, polyester resins are frequently employed and it is customary for the worker to tool the patched area to a semifinished contour before total curing occurs, subsequently finishing the area with sanding at about the time curing is completed. Here, obviously, it is imperative that the worker know precisely the degree of cure. If insufficient for tooling, the patch may be ruined; if totally cured, tooling becomes more difficult thereby decreasing efficiency. General experience regarding cure rates can be an asset but is not always the answer inasmuch as curing rates are also effected by temperature, humidity and even differing thicknesses of the patch. Despite recognition of the problems, there has not existed heretofore a simple, inexpensive method to determine the degree of cure or the completion thereof.

Furthermore, when a pigment is employed in the catalyst, color is imparted to the final cured product and, in some instances, this may be an advantage. However, many applications require that the product be free from color, particularly those which are white. Still other products are coated with a desired paint which lacks sufficient pigment to cover the color of the cured product in which instance the color will actually appear through the final paint coat. Disappearance or masking of the color imparted by the pigment upon curing of the resin would, therefore, greatly simplify painting and other coating operations if not totally eliminate them.

Pigments which can be suitably blended with peroxide catalysts and subsequently mixed with resin systems to indicate uniform dispersion of the catalyst in the resin and to impart color to the cured product, are disclosed in U.S. Pat. No. 3,181,991. Of course, the use of these pigments has not facilitated determination of the degree or actual completion of cure and, their presence in the cured product can be an impediment to painting operations.

SUMMARY OF THE INVENTION

It is therefore an object of the present invention to provide a method for determining the extent to which a polyester or epoxide resin has cured as well as the completion of the cure by employing a pigment the color of which substantially disappears from the resin product as curing progresses.

It is another object of the present invention to provide a method for determining the uniform dispersion of a catalyst throughout polyester or epoxide resins by employing a pigment the color of which substantially disappears from the resin product as curing progresses.

It is yet another object of the present invention to provide a pigment which can be added to a catalyst or polyester or epoxy resins, the color of which fades with respect to the degree of cure of the catalyzed resin and is substantially gone when curing is completed.

It is yet another object of the present invention to provide a benzoyl peroxide paste catalyst carrying a pigment which imparts color to a polyester resin indicating uniform distribution of the catalyst throughout the resin upon mixing thereof and which subsequently fades as the polyester resin cures to provide a cured product substantially free from the color of the pigment.

These and other objects of the present invention, together with the advantages thereof over existing and prior art forms, which will become apparent from the following specification, are accomplished by means hereinafter described and claimed.

In general, the preferred method for determining the degree of cure of polyester and epoxy resins includes the steps of adding a suitable catalyst containing a pigment to the resin; mixing the two components to provide a uniform distribution of the catalyst and pigment throughout the resin; and, depositing the mixture in a desired position for curing. For polyester resin systems, the pigment is employed in amounts of from about 0.03 to about 0.16 percent by weight, based upon the weight of the catalyst. Alternatively, it may be added to the polyester resin in amounts of from about 0.009 to about 0.16 percent by weight, based upon the weight of the resin. In epoxy resin systems, the pigment may be added to the catalyst, or hardener, component or it may be added to the resin. Amounts can vary from about 0.005 to about 0.25 percent by weight based upon the combined weight of the total system.

Depending upon the resin selected and the type of process for making the product that will be employed, the resin-catalyst mixture can be deposited in various manners and positions for curing. Polyester resins, for instance, when utilized in body repair work, will be applied directly to a substrate to build-up or fill-in a recessed area. As the resin cures, its color will disappear, readily providing the worker with a direct indication of the progress and ultimate completion of the cure, so that subsequent operations such as contouring, sanding, painting and the like can be undertaken without damaging the repaired area. Polyester resins can also be employed for molding industrial or automotive plastic parts, such as radiator fan shrouds for vehicles, which may be reinforced with conventional materials such as fiberglass. When this operation is desired, the resin-catalyst mixture is deposited in a suitable mold which is thereafter closed and placed in an oven. The catalyst is preferably selected and compounded so that it will not initiate curing of the resin until subjected to heat in the oven. In the environment of a closed mold, placed within an oven, the worker would not normally monitor the progress of cure visually. However, the present invention still provides a unique advantage over the prior art inasmuch as the finished product, removed from the mold, will bear substantially little of the color of the pigment.

Similarly, epoxy resin systems can be mixed together for curing in a mold, or a liquid resin-catalyst mixture can be employed in a room temperature spray-up application for marine and structural components, the spray being deposited upon fiberglass reinforcement. Again, the advantages of utilizing the heat-sensitive pigment are maintained; direct observation of uniform catalyst and resin mixture; color fade with respect to degree of cure; and substantial disapperance of the pigment color from the cured product.

It is to be understood by those skilled in the art that the present invention is not specifically directed toward any unique method of plastic processing, e.g., hand application of body filler materials to surfaces, hand or mechanical feeding of resin-catalyst mixtures to molds, spray deposition of the mixtures and the like. By utilizing the pigment disclosed herein, the advantages of this invention shall be obtained.

DESCRIPTION OF THE PREFERRED EMBODIMENT

Organic peroxide initiators for curing polyester resins are generally known to those skilled in the art as are the various resins. Suitable initiators such as those which are described in a copending patent application, Ser. No. 819,397, assigned to the assignee of record herein, The Alco Standard Corporation, the subject matter of which is incorporated herein, comprise a solid or liquid organic peroxide, a plasticizer, and one or moe processing aids, fire-retardant compounds and the like as may be desirable.

In lieu of the more conventionally employed pigments which impart their color to the cured product, it has now been found that certain pigments exist which will lose their color during the polymerization of the plastic with which they are incorporated. One pigment that is particularly suitable to the practice of this invention is Oil Red dye, Oil Red being a registered trademark of E. I. duPont de Nemours & Co. for a petroleum dye, essentially a methyl derivative of azobenzene 4-azo-2 naphthol. Oil Red dye can be added directly to the resin in quantities sufficient to impart a color thereto or similarly, it can be added to the catalyst. When added to polyester resin, it is employed in quantities of from about 0.009 to about 0.16 percent by weight, based upon the weight of the resin. When added to the catalyst, it is employed in quantities of from about 0.03 to about 0.16 percent by weight, based upon the weight of the catalyst, with 0.07 percent being preferred. The preferred amount is sufficient to give optimum color change, when mixed with a conventional polyester body filler, and subsequently show the most fading in the cured product.

The pigment can also be employed with epoxy resin systems as an additive to the resin component or to the amine-containing catalyst or hardener. As will be understood by those skilled in the art, such systems are conveniently packaged as two separate components, one being the resin component and the other containing an amine catalyst or hardener with resin fillers and other ingredients for processing and the like. In other embodiments, the catalyst alone will be added to the resin in an amount sufficient for polymerization thereof. Irrespective of which ingredient carries the pigment, as well as other ingredients which may be present, concentrations of the pigment can vary from about 0.005 percent to about 0.25 percent by weight based upon the combined weight of the total system with about 0.10 percent being preferred.

In either instance, there should be enough of pigment employed to indicate thorough mixing of the ingredients. During polymerization of the monomer in the resin, a peak exotherm is reached at which point a significant portion of the curing process is complete. While further increases in physical properties, relating to the curing process will be accomplished during the reduction of temperature from peak exotherm to room temperature, improving such properties as hardness and adhesion, the indication of peak exotherm by the fading of the color imparted by the pigment, assures the worker that finishing operations can be commenced. And as stated hereinabove, the cured product will have substantially the same color, or lack thereof, as would be obtained from the same resin and catalyst without any pigment. Any residual trace of color that may appear in some products should not be of sufficient intensity to interfere with the objects of this invention.

Although color from the Oil Red dye fades from the resin-catalyst systems during polymerization, an exothermic reaction, no color change is observed when the pigment itself is heated; or when the pigment and an organic peroxide are mixed together and heated; or when the polyester or epoxy resin and pigment are mixed together and heated. Separate storage of the pigmented resin or the pigmented catalyst is therefore possible, at temperatures of up to about 66° C., without loss of color. The pigment will only lose its color in the combined presence of the resin monomer and the organic peroxide catalyst while polymerization occurs.

Temperature sensitivity of the dye in the resin-catalyst environment is from about 49° to 66° C. for room temperature repair work such as in automobile body shops, and from about 49° to 205° C. for the higher temperature polymerization processes which would include room temperature spray-ups, industrial equipment and automotive part fabrication, wherein exotherm heat of polymerization reaction is higher.

In order to demonstrate achievement of the objects of the present invention, a 50.0 gm sample of standard polyester body filler was admixed with a catalytic amount (2.0 gm) of a typical benzoyl peroxide paste having about 48-50% benzoyl peroxide by weight; 15-17% plasticizer; 10-12% surfactants; about 1% metal stearates and 20-26% water. The paste was pigmented with about 0.07% Oil Red dye. Body filler and paste were mixed in a container for 1 minute at which time the entire mixture was colored light pink providing visual verification that thorough mixing had taken place. The mixture was then removed from the container and applied to a metal substrate, a thickness of approximately one-quarter inch being maintained. The chart which follows provides the relationship of time, temperature and color from the time of application.

| Time (Minutes) | Temperature °C. | Comments |
| --- | --- | --- |
| 0 | | |
| 3 | 20 | |
| 5 | 20 | *Gel began to occur |

-continued

| Time (Minutes) | Temperature °C. | Comments |
|---|---|---|
| 7 | 21.5 | |
| 9 | 22 | |
| 11 | 26.5 | |
| 13 | 37 | |
| 14 | 48 | Color change began |
| 16 | 66 | |
| 17 | 66 | Color change completed |
| 18 | 64 | Temperature started to decline |

*Gel time is indicated by the thickening of the material to a point when the material can no longer be "worked" or physically applied to the substrate as a mobile semi-solid.

In the foregoing example, color change began at about 14 minutes and concluded at 17 minutes after application. During this period, the worker could have commenced formation of the final contour, before final cure and hardness occurred, as determined by color fade. The advantage of this procedure is apparent from the fact that the patched area is more readily cut-away at peak exotherm before subsequent cooling, total cure and increasing hardness occur. Thereafter, sanding and painting operations can then be performed.

Because different thicknesses cure at different rates, an identical sample to the first was prepared and was then applied to a metal substrate in thicknesses of from one-sixteenth of an inch to one-quarter inch. It can be seen from the following chart that the time of color change is elongated as the sample thickness decreases. The color change is, however, directly related to the time required for the material to reach peak exotherm, generally less time being necessary for thicker areas. The thicknesses chosen are typical of the average auto body repair.

| Thickness of Sample | Color Change Start (minutes) | Color Change Complete (minutes) |
|---|---|---|
| 1/4 inch | 9.5 | 11.75 |
| 1/8 inch | 10.75 | 13.0 |
| 1/16 inch | 12.0 | 16.25 |

In order to demonstrate the usefulness of the present invention as a visual aid to mixing of elevated temperature molding compounds, a test was conducted as follows. A molding compound manufactured according to standard formulation, currently employed in the industry to produce reinforced fiberglass panels, was pigmented with Oil Red dye until the compound was light pink and evenly colored, indicating evenness of mix. Normally a pigment could not be used inasmuch as the end product is white. Without a pigment, however, it is impossible to view the resin-catalyst mixture and determine evenness or thoroughness of the catalyst distribution during mixing. The molding compound was introduced into a test mold cavity in the laboratory with both top and bottom molds set at 138° C. The press was closed and allowed to cycle through a 1.5 minute "close" cycle. When the part was removed, the traces of pink colorant had faded to a point where it would no longer interfere in the "whiteness" specification of the part.

Tests were also performed on an epoxy resin which required approximately six hours to "gel" and approximately 24 hours to reach maximum cure. Oil Red dye was added to a standard two-part epoxy resin and allowed to cure for 24 hours. The color began to fade at about 6 hours and was complete after 24 hours. The resin was cured at a temperature of about 64.5° C.

Thus, it can be seen that employing Oil Red dye in certain resin-catalyst mixtures will enable the worker to observe first, the uniformity of the mixture of the two ingredients which are combined for curing in such systems, i.e., polyester resin and organic peroxide catalyst or two-part epoxy resin system; and, second, when the cure has been completed, as indicated by the substantially total disappearance of the color imparted by the dye upon completion of the cure. As will be apparent to those skilled in the art, the composition of the polyester resins, the epoxy resins and the catalysts can be selected according to availability of ingredients, desirability of process and nature of the end product. The method disclosed herein is applicable to known combinations of these ingredients and shall enable the worker to achieve the objects of the invention.

It is believed that the method disclosed herein can also be practiced with other dyes and pigments which can lose their color during the polymerization reaction and which would not be deleterious to the components. It is furthermore believed that the preparation and use of these pigmented catalysts or pigmented resin components can be determined without departing from the spirit of the invention herein disclosed and described, the scope of the invention being limited solely by the scope of the attached claims.

I claim:
1. A novel pigmented organic peroxide catalyst for the polymerization of polyester resins comprising:
   from about 48–50% by weight of benzoyl peroxide;
   a suitable plasticizer; and
   from about 0.03 to about 0.16 percent by weight of a pigment capable of imparting a uniform color to said catalyst and to a polyester resin with which said catalyst is mixed and of substantially losing said color when the catalyst-resin mixture has cured.
2. A novel organic peroxide catalyst, as set forth in claim 1, wherein said pigment is Oil Red dye.
3. A novel organic peroxide catalyst, as set forth in claim 2, wherein said plasticizer is present in an amount of from about 15 to 17% by weight and said catalyst further comprises:
   from about 10–12% by weight of a surfactant;
   about 1% by weight of a suitable metal stearate; and,
   from about 20–26% by weight of water.
4. A method for determining the degree of cure of polyester resin systems comprising the steps of:
   adding to a polyester resin compound a catalyst having a color imparted thereto by a pigment present in an amount of from about 0.03 to about 0.16 percent by weight, based upon the weight of the catalyst;
   mixing said resin and said catalyst until said pigment is uniformly dispersed throughout said resin and imparts its color to the mixture; and,
   depositing the mixture of resin and catalyst in a desired position for curing during which the color imparted the mixture by said pigment substantially disappears, allowing the degree of cure and the completion thereof to be visually determined.
5. A method for determining the degree of cure of epoxy resin systems comprising the steps of:
   adding to an epoxy resin compound a catalyst having a color imparted thereto by a pigment present in an amount of from about 0.005 to about 0.25 percent by weight, based upon the total weight of the system;

mixing said resin and said catalyst until said pigment is uniformly dispersed throughout said resin and imparts its color to the mixture; and, depositing the mixture of resin and catalyst in a desired position for curing during which the color imparted the mixture by said pigment substantially disappears, allowing the degree of cure and the completion thereof to be visually determined.

6. A method for visually determining the uniform dispersion of a catalyst throughout a polyester resin mixed therewith without imparting a color to the cured product substantially different from that of the uncured resin comprising the steps of:

adding to a polyester resin compound a catalyst having a color imparted thereto by a pigment present in an amount of from about 0.03 to 0.16 percent by weight, based upon the weight of the catalyst;

mixing said resin and said catalyst until said pigment is uniformly dispersed throughout said resin and imparts its color to the mixture; and, depositing the mixture of resin and catalyst in a desired position for curing during which the color imparted the mixture by said pigment substantially disappears.

7. A method for visually determining the uniform dispersion of a catalyst throughout an epoxy resin mixed therewith without imparting a color the cured product substantially different from that of the uncured resin comprising the steps of:

adding to an epoxy resin compound a catalyst having a color imparted thereto by a pigment present in an amount of from about 0.005 to about 0.25 percent by weight, based upon the total weight of the system;

mixing said resin and said catalyst until said pigment is uniformly dispersed throughout said resin and imparts its color to the mixture; and, depositing the mixture of resin and catalyst in a desired position for curing during which the color imparted the mixture by said pigment substantially disappears.

8. A method, as set forth in claims 4, 5, or 9, wherein said pigment is Oil Red dye.

* * * * *

UNITED STATES PATENT AND TRADEMARK OFFICE
CERTIFICATE OF CORRECTION

PATENT NO. : 4,164,492
DATED : August 14, 1979
INVENTOR(S) : Troy L. Cooper

It is certified that error appears in the above-identified patent and that said Letters Patent are hereby corrected as shown below:

Column 3, line 16, "disapperance" should read --disappearance--.

Column 3, line 36, "moe" should read --more--.

Column 8, line 22, "claims 4, 5, or 9" should read --claims 4, 5, 6 or 7--.

Signed and Sealed this

Fifteenth Day of April 1980

[SEAL]

Attest:

SIDNEY A. DIAMOND

Attesting Officer

Commissioner of Patents and Trademarks